(12) United States Patent
Beckmann et al.

(10) Patent No.: US 8,098,765 B1
(45) Date of Patent: Jan. 17, 2012

(54) REDUCING AND SHARING COMPUTATIONS FOR GPS SIGNAL PROCESSING

(75) Inventors: Paul Eric Beckmann, Sunnyvale, CA (US); Andrew Chou, Santa Clara, CA (US); Julien Basch, New York, NY (US)

(73) Assignee: SIRF Technology, Inc., San Jose, CA (US)

( * ) Notice: Subject to any disclaimer, the term of this patent is extended or adjusted under 35 U.S.C. 154(b) by 682 days.

(21) Appl. No.: 11/064,682

(22) Filed: Feb. 23, 2005

Related U.S. Application Data

(60) Provisional application No. 60/547,395, filed on Feb. 23, 2004.

(51) Int. Cl.
*H03K 9/00* (2006.01)

(52) U.S. Cl. ........ 375/316; 375/343; 375/299; 375/346; 375/340; 375/367; 375/150; 375/142

(58) Field of Classification Search .................. 375/346, 375/285, 142, 150, 343, 367
See application file for complete search history.

(56) References Cited

U.S. PATENT DOCUMENTS

| | | | |
|---|---|---|---|
| 6,044,105 A * | 3/2000 | Gronemeyer | 375/152 |
| 6,407,699 B1 * | 6/2002 | Yang | 342/357.12 |
| 6,583,758 B2 | 6/2003 | King | 342/357.13 |
| 6,606,346 B2 | 8/2003 | Abraham et al. | 375/142 |
| 6,643,678 B2 * | 11/2003 | Van Wechel et al. | 708/530 |
| 6,704,348 B2 | 3/2004 | Abraham et al. | 375/150 |
| 6,750,814 B1 * | 6/2004 | Nir et al. | 342/357.12 |
| 6,806,827 B2 | 10/2004 | Warloe et al. | 342/357.12 |
| 6,909,738 B2 * | 6/2005 | Akopian et al. | 375/142 |
| 6,975,690 B1 * | 12/2005 | Lin et al. | 375/326 |
| 7,042,930 B2 | 5/2006 | Dafesh | 375/149 |
| 7,190,712 B2 * | 3/2007 | Abraham et al. | 375/150 |
| 7,197,064 B2 * | 3/2007 | Loomis et al. | 375/148 |
| 7,209,529 B2 * | 4/2007 | Iancu et al. | 375/346 |
| 7,224,721 B2 * | 5/2007 | Betz et al. | 375/152 |
| 2002/0012387 A1 * | 1/2002 | Shakeri et al. | 375/150 |
| 2002/0025011 A1 * | 2/2002 | Sullivan | 375/343 |
| 2002/0064210 A1 * | 5/2002 | Sullivan | 375/145 |
| 2003/0161543 A1 * | 8/2003 | Tanaka | 382/250 |
| 2003/0215005 A1 * | 11/2003 | Kontola et al. | 375/149 |
| 2004/0088108 A1 * | 5/2004 | Bloebaum et al. | 701/207 |
| 2005/0257844 A1 * | 11/2005 | Draper | 138/30 |
| 2007/0233383 A1 * | 10/2007 | Churan | 701/213 |

* cited by examiner

*Primary Examiner* — Shuwang Liu
*Assistant Examiner* — Kenneth Lam
(74) *Attorney, Agent, or Firm* — Haynes and Boone, LLP

(57) ABSTRACT

Methods and systems for processing a Global Positioning System (GPS) signal are provided. A method includes: transforming a time domain GPS signal to a frequency domain GPS signal; storing a frequency domain pseudorandom noise (PRN) signal; correlating the frequency domain GPS signal with the PRN signal at a plurality of frequencies, said correlating including: shifting the frequency domain GPS signal by an amount corresponding to one of the plurality of frequencies; downsampling the shifted frequency domain GPS signal; and multiplying the shifted frequency domain GPS signal by the stored frequency domain PRN signal to produce a correlated signal.

16 Claims, 4 Drawing Sheets

REDUCING AND SHARING COMPUTATIONS FOR GPS SIGNAL PROCESSING

CROSS-REFERENCE TO RELATED APPLICATIONS

This application claims the benefit of U.S. Provisional Application No. 60/547,395, filed on Feb. 23, 2004, entitled "Method and System for Reducing and Sharing Computations While Searching for Multiple GPS Satellites at Multiple Frequencies," the disclosure of which is incorporated by reference herein in its entirety.

BACKGROUND

The application relates generally to signal processing systems and more specifically to signal processing systems for satellite-based navigation systems.

Satellite-based navigation typically involves a device with a radio frequency (RF) receiver for receiving signals from satellites orbiting earth, and signal processing components for processing the received signals. The global positioning system (GPS) is a well-known satellite-based navigation system that includes a constellation of GPS satellites, each of which constantly transmits a unique pseudorandom noise (PRN) code. When a GPS device initially acquires satellite signals, it searches over many possible satellites and over many possible frequencies per satellite according to known methods. Typical search methods include modulating a received signal with a reference signal, correlation, and searching for signal peaks in the correlation output. Therefore, the initial search over many satellite/frequency pairs requires many computations.

FIG. 1 is a block diagram of a prior art GPS device 100 for receiving and processing GPS signals. The device includes an RF antenna 110 and receiver 120. The RF signal is processed in multiple flows for a single satellite. Two of the multiple processing flows, flow 102 and flow 104 are shown. Each flow represents processing for one satellite/frequency pair. In the example of FIG. 1, flow 102 represents processing of the signal from satellite 1 at frequency 1 and flow 104 represents processing of the signal from satellite 1 at frequency $f_M$, where there are N possible satellites and M possible frequencies. The flows 102 and 104 include blocks that represent hardware and/or software components for performing certain operations. Typically, the hardware and/or software are not actually duplicated for each flow, but are time-multiplexed between flows.

The satellite signal appears at the output of the RF component at some unknown satellite frequency. This unknown frequency consists of a known portion which is characteristic of the RF receiver 120 (such as location and velocity) and an unknown portion which is due to uncertainty in the satellite velocity and uncertainty in the local oscillator frequency. The output of the RF component is mixed in the time domain with an estimate of the satellite frequency. This mixing operation 121 is accomplished by multiplying with a complex exponential.

The signal is then correlated with a copy of the satellite's PRN code. This correlation can be performed in the time or frequency domains. One type of correlation is performed in the time domain using the three step correlation operation 124 shown in FIG. 1. If 1 msec of data is correlated, then the satellite search process can cover 1 kHz of the frequency uncertainty. In the device 100 shown in FIG. 1, 8 msec of the mixed data is stacked (or time-aliased) before the correlation operation. This stacking operation 122 gives more sensitivity than looking at 1 msec, but narrows the frequency search from 1 kHz to 125 Hz intervals, so more operations must be performed.

After correlation is performed, the output of the correlation operation 124 is examined to look for signal peaks. For strong signals, the peaks are obvious within a single correlation result. For weak signals, multiple correlation results are combined to increase the height of the peak. The traditional method of combining correlation results consists of squaring them and then averaging them together. This squaring operation doubles the effective bandwidth of the signal and thus reduces the frequency search interval from 125 to 62.5 Hz. This effectively doubles the required computation.

In one known method, for example, correlation is performed with fast Fourier transforms (FFTs). In effect this is a circular convolution operation. As shown in FIG. 1, this includes the three stages of: a forward FFT 131; a multiplication by a reference PRN (xPRN) 132; and an inverse FFT 133. Correlation is typically computation intensive, involving for example, table lookups and calculation of sines and cosines.

For each satellite/frequency pair (a total of N×M) all of the operations shown are repeated. As a result, the amount of processing performed to acquire a signal can be quite high. Accordingly, it is desirable to provide a more efficient system for processing received signals.

SUMMARY

In accordance with the present invention, a method is provided for processing GPS signals requiring significantly less computation than previous methods. In one embodiment, the method includes performing operations traditionally performed in the time domain in the frequency domain. The method further includes reusing the results of operations, thus avoiding the traditional repetition of some operations.

In accordance with embodiments of the present invention, a method of processing a Global Positioning System (GPS) signal is provided, comprising: transforming a time domain GPS signal to a frequency domain GPS signal; storing a frequency domain pseudorandom noise (PRN) signal; correlating the frequency domain GPS signal with the PRN signal at a plurality of frequencies, said correlating comprising: shifting the frequency domain GPS signal by an amount corresponding to one of the plurality of frequencies; downsampling the shifted frequency domain GPS signal; and multiplying the shifted frequency domain GPS signal by the stored frequency domain PRN signal to produce a correlated signal.

In accordance with other embodiments of the present invention, a receiver for processing a GPS signal is provided, comprising: a memory for storing a frequency domain GPS signal and a frequency domain pseudorandom noise (PRN) signal; a processor configured to: transform a time domain GPS signal to the frequency domain GPS signal and store the frequency domain GPS signal in the memory; store the frequency domain PRN signal in the memory; correlate the frequency domain signal with the PRN signal at a plurality of frequencies, said correlating comprising: shifting the frequency domain GPS signal by an amount corresponding to one of the plurality of frequencies; downsampling the shifted frequency domain GPS signal; and multiplying the shifted frequency domain GPS signal by the stored frequency domain PRN signal to produce a correlated signal.

In accordance with other embodiments of the present invention, a method of processing a Global Positioning System (GPS) signal is provided, comprising: producing a frequency domain representation of the GPS signal, the frequency domain GPS signal comprising a plurality of frequency bins having a bin frequency spacing of $f_b$; storing a frequency domain representation of a pseudorandom noise (PRN) signal; and correlating the GPS signal with the PRN signal at a plurality of M mixing frequencies with a mixing frequency spacing of $f_M = K \times f_b$, wherein K is a positive integer, said correlating comprising for each mixing frequency: shifting the frequency domain signal by K×S samples, wherein S is an integer ranging from 0 to (M−1) to obtain a frequency domain shifted signal shifted by $S \times f_M$; downsampling the frequency domain shifted signal; and multiplying the frequency domain shifted signal with the stored frequency domain representation of the PRN signal to produce a correlated signal.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Embodiments of the invention include a method for processing GPS signals requiring significantly less computation than previous methods. In one embodiment, the method includes performing operations traditionally performed in the time domain in the frequency domain. The method further includes reusing the results of operations, thus avoiding the traditional repetition of some operations.

Figure 2:
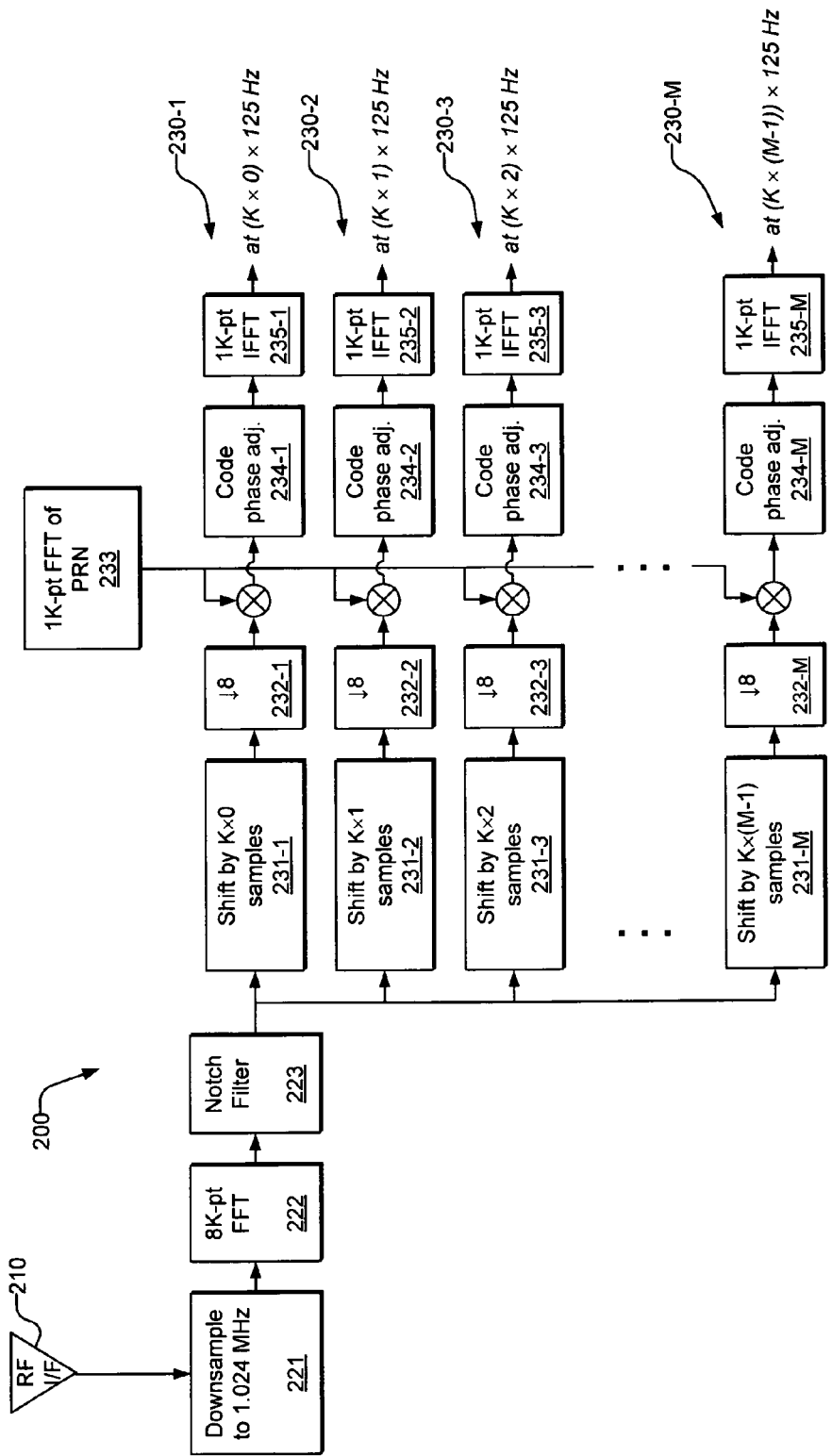
FIG. 2 is a block diagram of a satellite-based navigation system, in accordance with embodiments of the present invention.

FIG. 2 is a block diagram of a satellite-based navigation system 200, in accordance with embodiments of the present invention. The system 200 includes an RF antenna 210 that receives GPS signals transmitted by multiple satellites.

Figure 1:
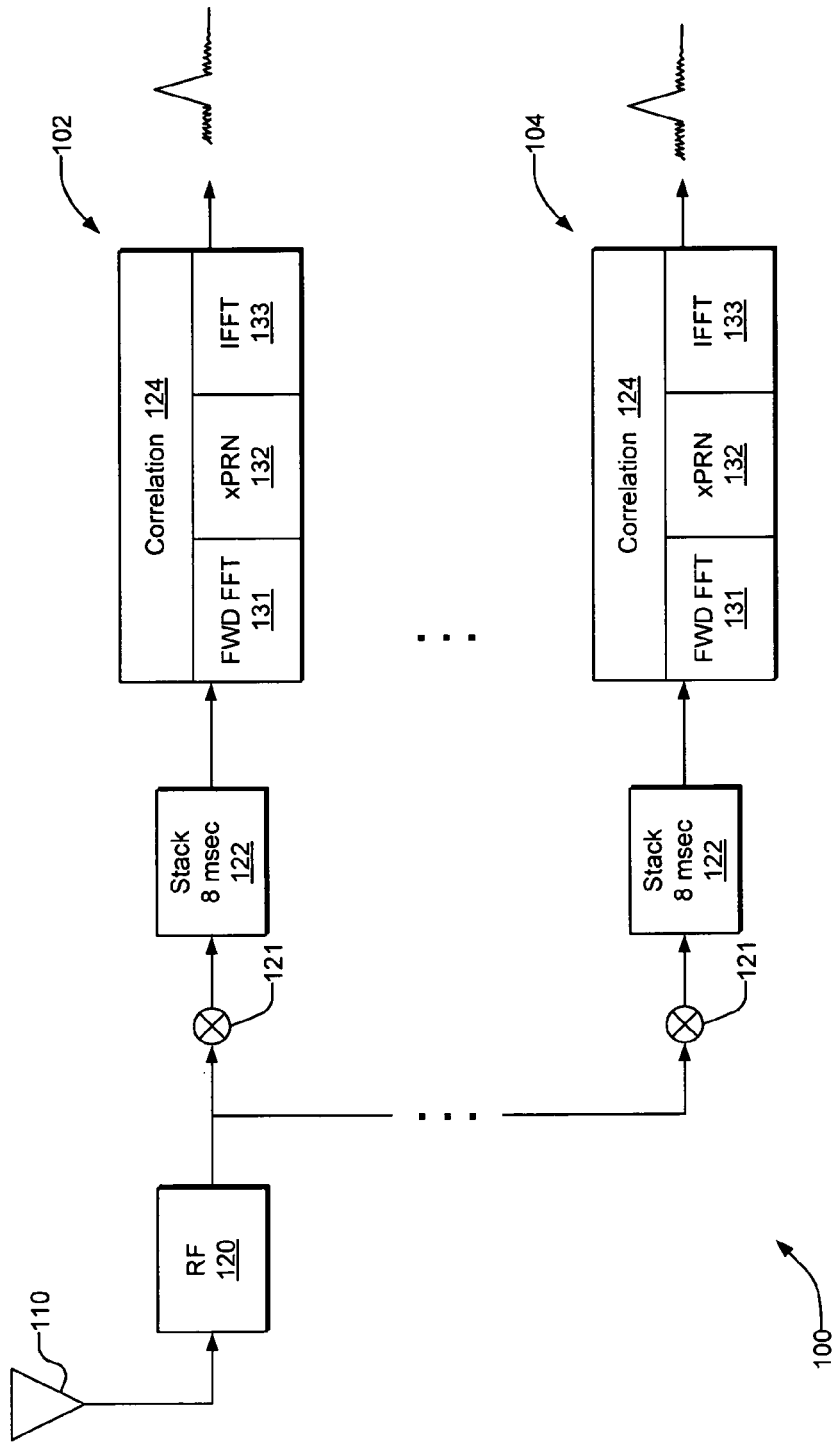
FIG. 1 is a block diagram of a prior art GPS device for receiving and processing GPS signals.

The received signal is downsampled in a downsample operation 221 to one MHz, and processed in 8 msec blocks. An 8K-point FFT 222 is performed once and reused across all satellite/frequency pairs. At one MHz, if an 8K FFT is performed, then the frequency bins of the FFT are spaced by 125 Hz. This allows a mixing operation at 125 Hz to be performed by shifting one sample in the frequency domain. In addition, it is possible to mix by any multiple K of 125 Hz just by shifting K samples in the frequency domain. In the frequency domain, the mixing operation is a circular shift. This essentially eliminates the entire mixing step 121 described above with respect to FIG. 1.

The output of the 8K-point FFT is passed through a notch filter 223 to remove narrow band noise (NBN). This removes the interfering noise from the 8K complex points of data in the frequency domain. This is the initial processing performed on 8 msec of received data, and is satellite neutral and frequency neutral.

The output of the notch filter 223 is then processed for each satellite/frequency pair. This is shown in FIG. 2 by the duplicated rows of processing flows 230, each of which receives the output of the notch filter 223.

The next operations shown in each of the processing flows 230 are a circular shift 231 in the frequency domain and downsampling 232. As will be explained, the prior stacking 122 and correlation 124 operations, which involved multiple computations for each satellite/frequency pair, are replaced by a different set of operations, some of which are reused, or shared, among all satellite/frequency pairs. A correlation operation 124, as previously discussed, can include three parts: a forward FFT 131, multiplication in the frequency domain by a reference PRN signal (xPRN) 132, and an inverse FFT (IFFT) 133. Each correlation operation 124 in FIG. 1 has these three components. According to an embodiment of the invention, the traditional mixing (or multiplication) operation 121 before the correlation 124 is eliminated and replaced by frequency domain shifts 231, as shown in FIG. 2. The frequency domain shifts 231 are achieved by performing circular shifts by K samples, circular shifts by K×2 samples, etc. The forward FFTs are then shared among all of the different channels, or satellite/frequency pairs. So instead of one 1024 ("K pt") FFT 131 that is repeated for each satellite/frequency pair, there is a single 8K point FFT 222 and that is reused later by each satellite/frequency pair. The circular shift 231 by K samples, as shown, is effectively a modulation, or mixing operation.

The next operation shown is downsampling 232 in the frequency domain. Downsampling in the frequency domain is equivalent to aliasing in the time domain by the downsampling factor. The 8 msec signal is aliased down to 1 msec. This frequency domain downsampling operation 232 replaces the traditional stacking operation 122.

The next step in each process flow is multiplying by the PRN 233 in the frequency domain. The PRN 233 for each satellite is calculated in advance and stored in read only memory (ROM) in a software implementation. Multiplication is performed sample-by-sample. Traditionally, multiplication in the frequency domain by an 8K representation of the PRN would be performed before downsampling (e.g., taking one out of every 8 samples). In the embodiment shown in FIG. 2, downsampling 232 is performed first. Thus, the multiplication is on 1K-pt of data and 1K-pt of the reference PRN is stored.

After the multiplication, a "code phase adjustment" 234, is performed as a fractional shift in the time domain. This fractional shift causes the correlation peak to shift slightly and allows multiple correlation peaks to be combined to form a sharp peak. In the frequency domain a fractional time shift is accomplished by multiplication by a linear phase term (complex modulation). After the code phase adjustment 234, the processing returns to the time domain, and the IFFT 235 is performed. The number of IFFT performed is equal to the product of the total number of satellites and the number of Doppler bins.

The system 200 is applicable for one satellite, so the same FFT data is stored for the one satellite. To search for multiple satellites, the FFT 222 and the PRN 233 are changed.

In accordance with the embodiment described in FIG. 2, the time domain modulation is accomplished by a "free" circular shift in the frequency domain. A buffer is offset by the appropriate amount and read out. The stacking operation is also "free" and is accomplished by a downsampling operation 232 in the frequency domain. One out of every eight samples in the buffer is used. In effect, the forward FFT 222 is amortized over many satellite/frequency combinations, then multiplication by the reference PRN 233, and the inverse FFT 235 are performed. Approximately ½ of the traditional computations are eliminated.

Figure 3:
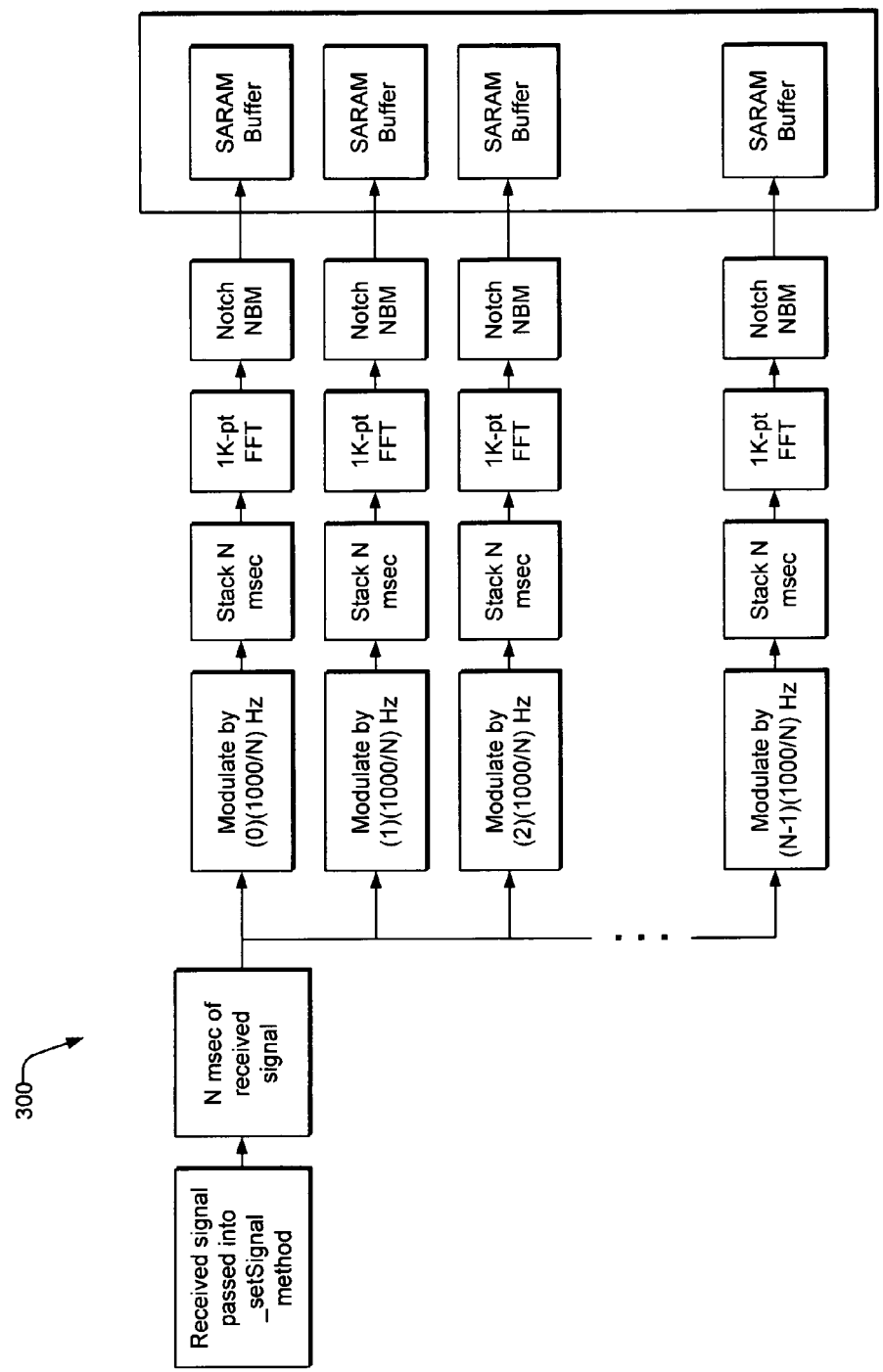
FIG. 3 is a block diagram of a routine call which generates the FFT output for N msec of received signal, in accordance with embodiments of the present invention.

The initial 8K point FFT 222 shown in FIG. 2 can be shared among different satellites. This is illustrated in FIG. 3 which shows a call to a single routine 300 (setSignal) which generates the FFT output for N msec of received signal. In this figure, the 8K-point FFT is calculated using 8 smaller 1K-point FFTs together with mixing and stacking operations. The buffers at the output of FIG. 3 are reused for all satellite/frequency combinations. These steps are independent of a specific satellite/frequency pair. This has the same effect as the modulation 121 and stacking 122 operations in the prior art FIG. 1, but is at a fixed set of frequencies: e.g., 0 Hz, 125 Hz, 250 Hz, 375 Hz, 500 Hz, 625 Hz, 750 Hz, and 875 Hz. Narrowband noise components are then removed from each FFT result.

Figure 4:
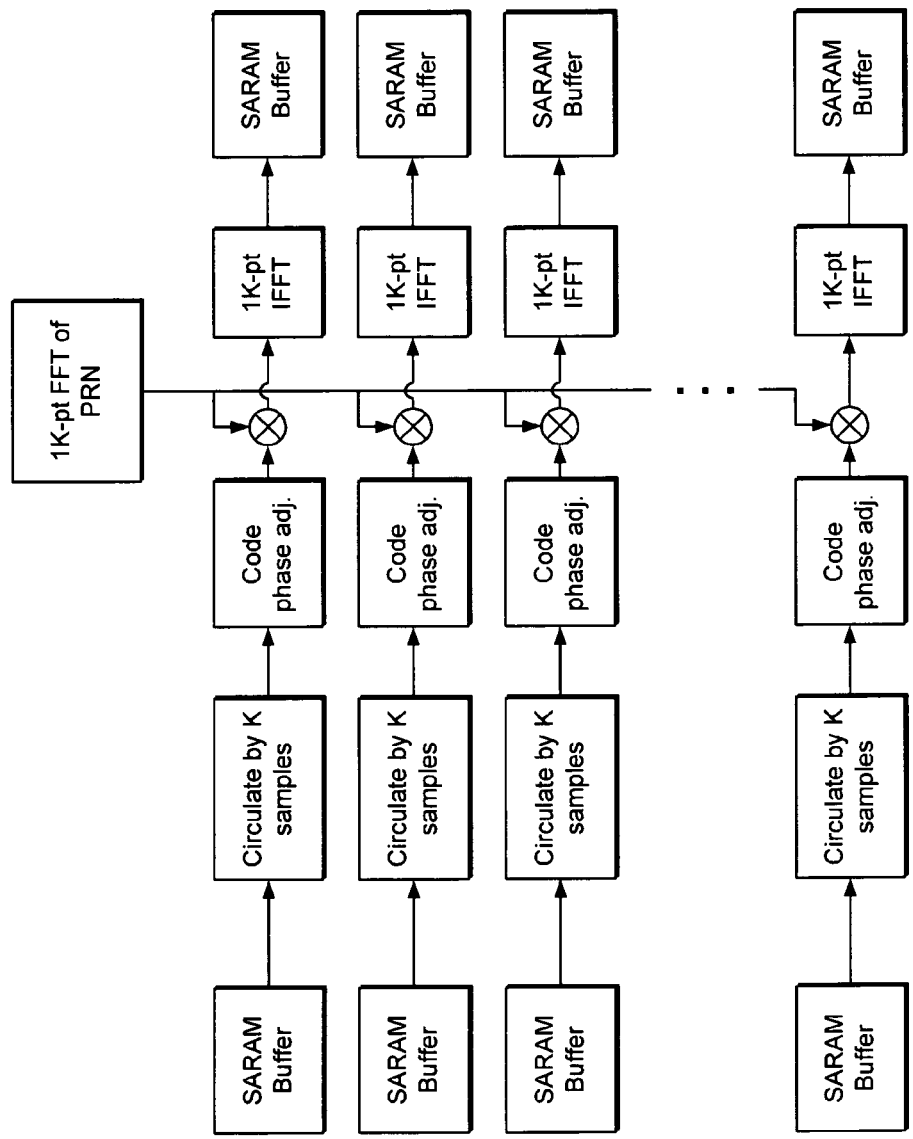
FIG. 4 is a block diagram further illustrating a correlation operation, in accordance with embodiments of the present invention.

FIG. 4 is a block diagram further illustrating a correlation operation, in accordance with an embodiment of the present invention. The SARAM buffers on the left correspond to the SARAM buffers on the right side of FIG. 3. A coarse Doppler mixing is performed in which the samples are circularly shifted and code phase adjustment is performed, as previously described. For a signal represented by a discrete FFT, coarse Doppler mixing by a mixing frequency $f_M$ can be performed by circular shifting of the values. For example, if a signal is represented by x1, x2, x3 ... xN, which corresponds to a discrete FFT with frequency spacing $f_b$=1000 Hz, then to mix the signal by $f_m$=1000 Hz, the points are shifted to provide a new mixed signal of x2, x3 ... xN, x1.

Code phase adjustment is performed by a multiplication by a complex exponential. The adjustment depends upon the center frequency of each bin and the number of milliseconds into the received signal. Then, the samples are multiplied by the PRN. Alternatively, the code phase adjustment can be performed after the multiplication by the PRN. Each row in the diagram corresponds to a single satellite/frequency pair, and the overall diagram represents the processing for one satellite. This processing is then repeated for each satellite.

Another embodiment of the invention is that correlations can be calculated at a 125 Hz interval even when squaring and combining correlation results to improve sensitivity. First, correlations are calculated at 125 Hz intervals as described above. Then, every other point is interpolated to obtain a finer sampling of 62.5 Hz. These interpolated results are then squared and averaged. Once the averaging is complete, another interpolation process occurs and this yields the final ambiguity function. This function is then searched for a peak.

Overall, embodiments of the present invention may reduce computation time by roughly a factor of four as compared to traditional frequency domain correlation methods. First, reusing the FFT of the signal for many satellite/frequency pairs saves about half the processing. If the signal processing is performed for only a single satellite, the conventional processing methods may be more efficient. However, when processing for multiple satellites, the reuse of the FFT can produce significant efficiencies. Second, because the correlations are computed at 125 Hz intervals rather than 62.5 Hz intervals, the processing is reduced by half again. Some additional processing is required to perform the interpolation, but this is small compared to the overall savings.

Various embodiments of the present invention take advantage of the efficiency of modulating frequency in the frequency domain. Modulation of frequency in the time domain typically requires multiplication by a complex number, thereby involving a substantial amount of processing time. On the other hand, performing a discrete FFT in the frequency domain simply requires a shift in the starting point by one bin. Thus, performing a frequency shift is relatively trivial in the frequency domain. This can be particularly advantageous when utilizing software-based GPS signal detection algorithms, as opposed to conventional time domain based hardware correlators.

Embodiments of the invention have been described with reference to particular examples, which are not intended to be limiting. The invention is applicable to many variations of signal processing systems not specifically described.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

The figures provided are merely representational and are intended to illustrate various implementations of the invention that can be understood and appropriately carried out by those of ordinary skill in the art.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

We claim:

1. A method of processing a Global Positioning System (GPS) signal, comprising:

transforming a time domain GPS signal extending over a plurality of milliseconds to a frequency domain GPS signal, wherein the frequency domain GPS signal has a frequency bin spacing of an inverse of the plurality of milliseconds; and correlating the frequency domain GPS signal with a frequency domain pseudorandom noise (PRN) signal at a plurality of frequencies, said correlating comprising:
  performing a circular shift on the frequency domain GPS signal by an amount corresponding to one of the plurality of frequencies;
  downsampling the shifted frequency domain GPS signal to produce a shifted and downsampled frequency domain GPS signal that has the same frequency bin spacing as a frequency bin spacing of the frequency domain PRN signal;
  multiplying the shifted and downsampled frequency domain GPS signal by the frequency domain PRN signal to produce a frequency domain correlated signal; and
  transforming the frequency domain correlated signal into a time domain correlated signal extending over a single millisecond.

2. The method of claim 1, wherein:
said frequency domain PRN signal comprises a plurality of frequency domain PRN signals corresponding to a plurality of satellites; and
said correlating the frequency domain GPS signal with the PRN signal at the plurality of frequencies comprises correlating the frequency domain GPS signal with a plurality of frequencies for each of the PRN signals.

3. The method of claim 1, wherein:
said transforming the time domain GPS signal to the frequency domain GPS signal comprises performing a fast Fourier transform (FFT) on the time domain GPS signal.

4. The method of claim 3, wherein:
said performing the FFT on the time domain GPS signal comprises performing an 8K point FFT.

5. The method of claim 1, further comprising:
performing a code phase adjustment on the correlated signal.

6. A receiver for processing a GPS signal, comprising:
a memory for storing a frequency domain GPS signal and a frequency domain pseudorandom noise (PRN) signal; and
a processor configured to:
  transform a time domain GPS signal extending over a plurality of milliseconds to a frequency domain GPS signal and store the frequency domain GPS signal in the memory, wherein the frequency domain GPS signal has a frequency bin spacing of an inverse of the plurality of milliseconds; and
  correlate the frequency domain signal with the PRN signal at a plurality of frequencies, said correlating comprising:
    performing a circular shift on the frequency domain GPS signal by an amount corresponding to one of the plurality of frequencies;
    downsampling the shifted frequency domain GPS signal to produce a shifted and downsampled frequency domain GPS signal that has the same frequency bin spacing as a frequency bin spacing of the stored frequency domain PRN signal;
    multiplying the shifted and downsampled frequency domain GPS signal by the stored frequency domain PRN signal to produce a correlated frequency domain signal; and
    transforming the correlated frequency domain signal into a correlated time domain signal extending over a single millisecond.

7. The receiver of claim 6, wherein said processor is further configured to:
  store a plurality of frequency domain PRN signals corresponding to a plurality of satellites; and
  correlate the frequency domain GPS signal with a plurality of frequencies for each of the PRN signals.

8. The receiver of claim 6, wherein said processor is further configured to:
transform the time domain GPS signal to the frequency domain GPS signal by performing a fast Fourier transform (FFT) on the time domain GPS signal.

9. The receiver of claim 8, wherein:
said performing the FFT on the time domain GPS signal comprises performing an 8K point FFT.

10. The receiver of claim 6, wherein said processor is further configured to:
perform an FFT on a time domain PRN signal to produce the frequency domain PRN signal.

11. The receiver of claim 6, wherein said processor is further configured to:
perform a code phase adjustment on the correlated signal.

12. A method of processing a Global Positioning System (GPS) signal extending over a plurality of K milliseconds, wherein K is a positive integer, comprising:
producing a frequency domain representation of the GPS signal, the frequency domain GPS signal comprising a plurality of frequency bins having a bin frequency spacing of $f_b$, wherein $f_b$ is an inverse of K milliseconds; and
correlating the GPS signal with a pseudorandom noise (PRN) signal at a plurality of M mixing frequencies with a mixing frequency spacing of $f_M = K \times f_b$, said correlating comprising for each mixing frequency:
  performing a circular shift on the frequency domain GPS signal by K×S samples, wherein S is an integer ranging from 0 to (M−1) to obtain a frequency domain shifted signal shifted by $S \times f_M$;
  downsampling the frequency domain shifted signal by K to produce a downsampled frequency domain shifted signal;
  multiplying the downsampled frequency domain shifted signal with a frequency domain representation of the PRN signal to produce a frequency domain correlated signal; and
  transforming the frequency domain correlated signal into a time domain signal extending over a single millisecond.

13. The method of claim 12, wherein:
said PRN signal comprises a plurality of frequency domain PRN signals corresponding to a plurality of satellites; and
said correlating the GPS signal with the PRN signal at the plurality of M mixing frequencies comprises correlating the frequency domain GPS signal with a plurality of M mixing frequencies for each of the PRN signals.

14. The method of claim 12, wherein:
said producing the frequency domain representation of the GPS signal comprises performing a fast Fourier transform (FFT) on a time domain representation of the GPS signal.

15. The method of claim 14, wherein:
said performing the FFT on the time domain GPS signal comprises performing an 8 thousand point FFT.

16. The method of claim 12, further comprising:
performing a code phase adjustment on the correlated signal.

* * * * *